United States Patent
Lundqvist

(10) Patent No.: US 9,794,841 B2
(45) Date of Patent: Oct. 17, 2017

(54) DEVICE AND A METHOD FOR PROVIDING NEIGHBORING CELL LISTS FOR CELLS IN A WCDMA NETWORK

(75) Inventor: Fredrik Lundqvist, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 106 days.

(21) Appl. No.: 14/425,453

(22) PCT Filed: Sep. 12, 2012

(86) PCT No.: PCT/SE2012/050960
§ 371 (c)(1),
(2), (4) Date: Mar. 3, 2015

(87) PCT Pub. No.: WO2014/042563
PCT Pub. Date: Mar. 20, 2014

(65) Prior Publication Data
US 2015/0257064 A1    Sep. 10, 2015

(51) Int. Cl.
*H04W 36/00* (2009.01)
*H04W 36/18* (2009.01)
*H04W 84/04* (2009.01)

(52) U.S. Cl.
CPC ... *H04W 36/0094* (2013.01); *H04W 36/0083* (2013.01); *H04W 36/18* (2013.01); *H04W 84/042* (2013.01)

(58) Field of Classification Search
CPC ......... H04W 36/0055; H04W 36/0061; H04W 36/0094; H04W 36/0083; H04W 36/18; H04W 84/042; H04W 8/08
See application file for complete search history.

(56) References Cited

U.S. PATENT DOCUMENTS

| | | | | |
|---|---|---|---|---|
| 7,613,444 | B2* | 11/2009 | Lindqvist et al. | 455/403 |
| 8,918,304 | B2* | 12/2014 | Le | G01S 5/021 342/458 |
| 9,226,130 | B2* | 12/2015 | Nylander | H04W 8/08 |
| 2003/0190916 | A1 | 10/2003 | Celedon et al. | |
| 2009/0191862 | A1 | 7/2009 | Amirijoo et al. | |
| 2009/0264130 | A1 | 10/2009 | Catovic et al. | |

FOREIGN PATENT DOCUMENTS

| | | |
|---|---|---|
| EP | 2 009 932 A1 | 12/2008 |
| GB | 2480432 A | 11/2011 |

(Continued)

OTHER PUBLICATIONS

Communication with Supplementary European Search Report, EP Application No. 12884413.1, dated Mar. 11, 2016.

(Continued)

*Primary Examiner* — Ayaz Sheikh
*Assistant Examiner* — Debebe Asefa
(74) *Attorney, Agent, or Firm* — Sage Patent Group

(57) ABSTRACT

A first network node provides a neighboring cell list for a first cell in a wireless telecommunications network. The first cell is served by a second network node. The first network node includes a collecting unit that collects information about a number of bursts of events and/or a number of radio link addition attempts for user equipments located in the first cell to cell(s) other than the first cell. The first network node includes a determining unit that determines a neighboring cell list for the first cell based on addition and/or removal threshold(s) related to the number of bursts of events and/or number of radio link addition attempts for user equipments located in the first cell to one or more cells other than the first cell. The first network node includes a providing unit that provides the determined neighboring cell list for the first cell to the second network node.

28 Claims, 7 Drawing Sheets

(56) References Cited

FOREIGN PATENT DOCUMENTS

| JP | 2011-518531 A | 6/2011 |
| JP | 2011-518531 A5 | 12/2013 |
| RU | 2010147382 A | 5/2012 |
| WO | WO 2009/132034 A1 | 10/2009 |
| WO | WO 2011/144589 A1 | 11/2011 |

OTHER PUBLICATIONS

Russian Office Action Corresponding to Russian Patent Application No. 2015113393/07(021001); Date of Completion of the Search: May 30, 2016; English Translation, 2 Pages.

Japanese Office Action Corresponding to Japanese Patent Application No. 2015-531884; dated Jun. 7, 2016; Foreign Text, 4 Pages.

International Search Report and Written Opinion of the International Searching Authority, International Application No. PCT/SE2012/050960, dated Aug. 30, 2013.

3GPP, Technical Specification, "3rd Generation Partnership Project; Technical Specification Group Radio Access Network; Automatic Neighbour Relation (ANR) for UTRAN; Stage 2 (Release 10)", 3GPP TS 25.484 V10.2.0 (Sep. 2012), 20 pp.

Ericsson AB, "Neighboring Cell Support WCDMA RAN—User Description", Jun. 3, 2010, 29 pp.

Govender et al., "A Self Optimising Algorithm for WCDMA Neighbour Lists using Fuzzy Logic", *IEEE Second International Conference on Computation Intelligence, Modelling and Simulation*, Sep. 2010, pp. 178-183.

* cited by examiner

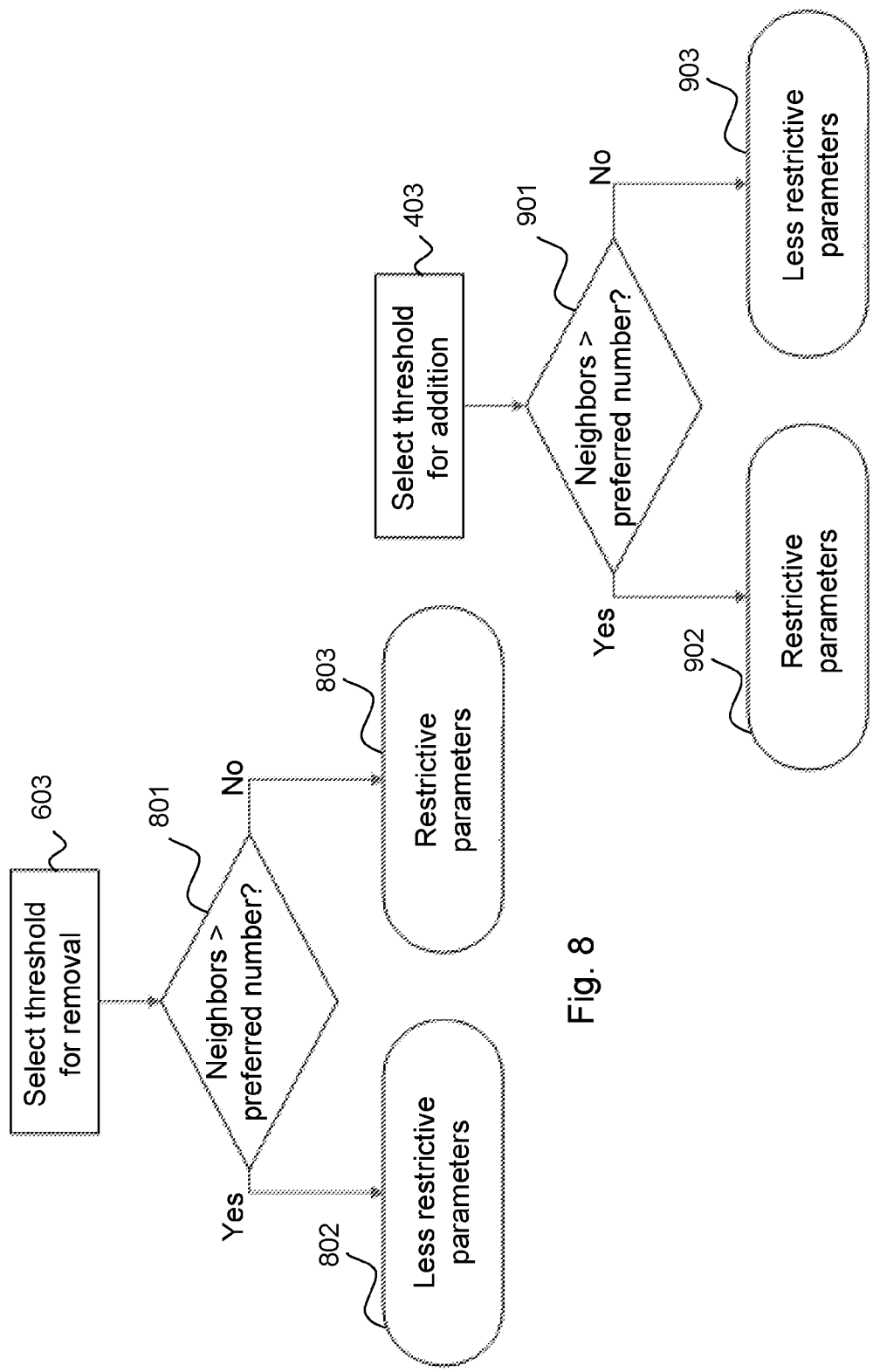

DEVICE AND A METHOD FOR PROVIDING NEIGHBORING CELL LISTS FOR CELLS IN A WCDMA NETWORK

CROSS REFERENCE TO RELATED APPLICATION

This application is a 35 U.S.C. §371 national stage application of PCT International Application No. PCT/SE2012/050960, filed on 12 Sep. 2012, the disclosure and content of which is incorporated by reference herein in its entirety. The above-referenced PCT International Application was published in the English language as International Publication No. WO 2014/042563 A1 on 20 Mar. 2014.

TECHNICAL FIELD

Embodiments herein relate to a device and a method in a Wideband Code Division Multiple Access (WCDMA) network. In particular, embodiments herein relate to providing neighboring cell lists for cells in a WCDMA network.

BACKGROUND

Neighboring Cell Support (NCS) is a feature in the Operations Support System for Radio & Core (OSS-RC) in a Wideband Code Division Multiple Access (WCDMA) network. The NCS feature in the OSS-RC is configured to collect information in the WCDMA network from a number of different sources, and present the results to an operator of the WCDMA network in various reports.

For example, via the Configuration Service (CS) in the OSS-RC, the NCS feature may collect data from different network elements. This may comprise Radio Network Controllers (RNCs) and cells present in the WCDMA radio access network, the frequencies and scrambling codes used by the cells, the defined neighboring relations of each cell, positional data of each cell, etc.

According to another example, the NCS feature may also collect information from Performance Management counters that measure the extent of defined neighboring cell relations usage.

According to a further example, a User Equipment (UE) continuously monitors its radio environment. Not only neighboring cells that are defined as neighboring cells in the a cell's neighboring cell list are measured, but also cells that are undefined neighboring cells can be detected with the background scanning process in the UE. The UE is configured to evaluate and send measurement reports to the network only when certain events occur, such as e.g. when the measurement result for a cell fulfills certain criteria. This concept is called event-triggered reporting. These events are collected by the General Performance Event Handling (GPEH) function in the WCDMA network. The NCS feature may schedule recordings of GPEH events for each cell, collect the files of the recordings, and processes the GPEH events related to the measurement of surrounding cells of each cell.

Thus, the NCS feature enables an operator of the WCDMA network to view its reports in order to generate and update the neighboring cell lists of the cells with properly defined neighboring cell relations. In the WCDMA network, the neighboring cell lists are used when performing soft-handovers (SOHO) between cells.

While properly defined neighboring cell relations is one of the most contributing factors to fewer dropped calls when performing SOHO in a WCDMA network, achieving such properly defined neighboring cell relations requires a lot of resources and knowledge of neighboring cell relations from the operator. Also, dependent on the knowledge of the operator on neighboring cell relations and resources, the configuration and updates of neighboring cell list for a cell in a WCDMA network may differ significantly.

SUMMARY

It is an object of embodiments herein to provide uniform and consistent neighboring cell-list configurations of network nodes in a wireless telecommunications network.

According to a first aspect of embodiments herein, the object is achieved by a first network node for providing a neighboring cell list for at least one first cell in a wireless telecommunications network is provided. The at least one first cell is served by at least one second network node connected to the first network node. The first network node comprises a collecting unit configured to collect information about a number of bursts of events and/or a number of radio link addition attempts for user equipments located in the at least one first cell to one or more cells other than the at least one first cell. The first network node further comprises a determining unit configured to determine a neighboring cell list for the at least one first cell based on one or more addition and/or removal thresholds related to the number of bursts of events and/or number of radio link addition attempts for user equipments located in the at least one first cell to one or more cells other than the at least one first cell. Also, the first network node comprises a providing unit configured to provide the determined neighboring cell list for the at least one first cell to the second network node serving the at least one first cell.

According to a second aspect of embodiments herein, the object is achieved by a method in a first network node for providing a neighboring cell list for at least one first cell in a wireless telecommunications network. The at least one first cell is served by at least one second network node connected to the first network node. The first network node collects information about a number of bursts of events and/or a number of radio link addition attempts for user equipments located in the at least one first cell to one or more cells other than the at least one first cell. Also, the first network node determines a neighboring cell list for the at least one first cell based on one or more addition and/or removal thresholds related to the number of bursts of events and/or number of radio link addition attempts for user equipments located in the at least one first cell to one or more cells other than the at least one first cell. Then, the first network node provides the determined neighboring cell list for the at least one first cell to the second network node serving the at least one first cell.

By determining neighboring cell lists for cells based on a number of different removal and addition thresholds related to the number of bursts of events and/or number of radio link addition attempts as described above, the network node may be configured and updated with well-performing predictable neighboring cell lists without risking being dependent on inherently deficient manual configurations performed by non-skilled operators.

Hence, the network node enables a uniform and consistent configuration of neighboring cell lists in the wireless communication network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIGS. 4-9 are flowcharts depicting embodiments of a method in a network node.

DETAILED DESCRIPTION

Figure 1:
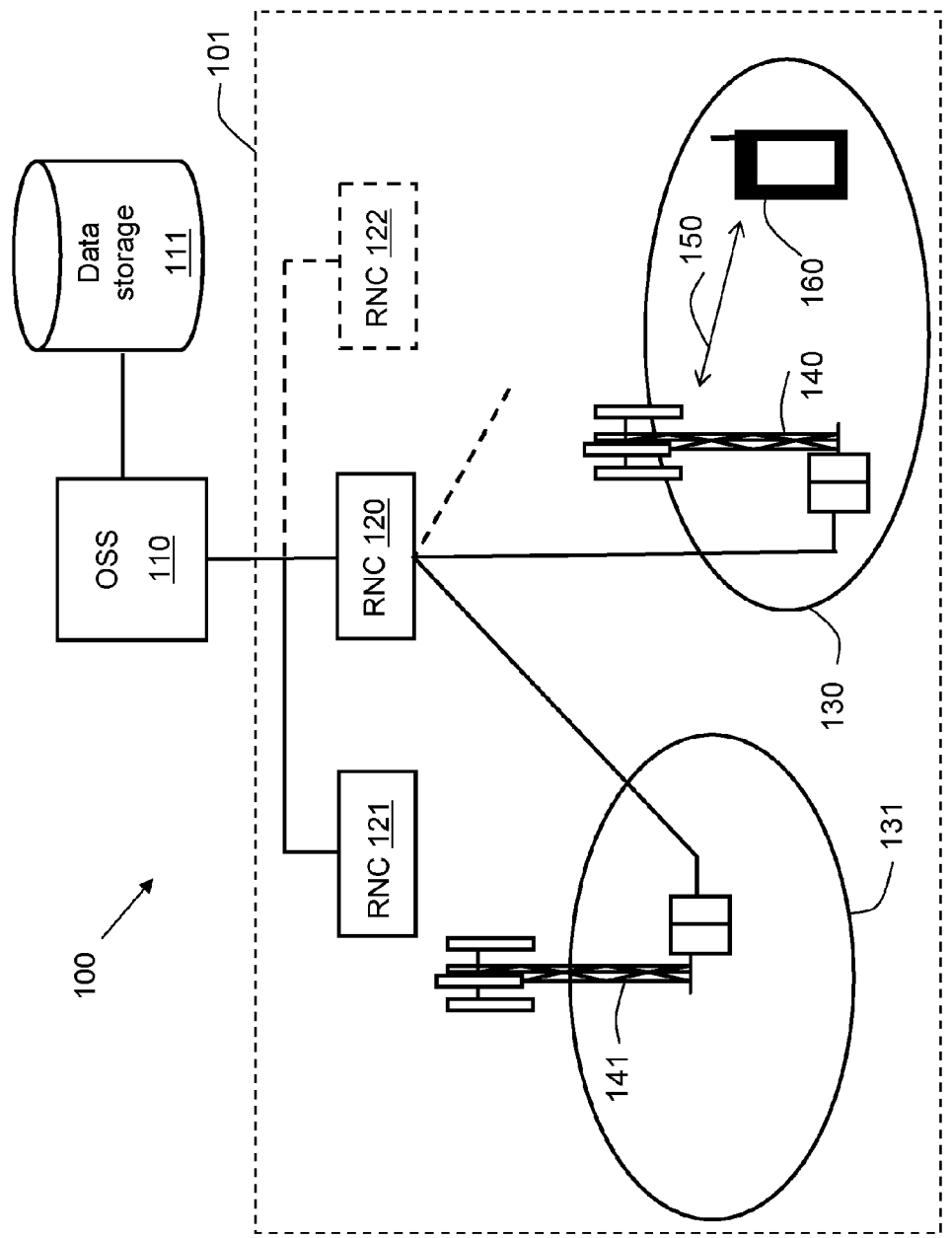
FIG. 1 is a schematic block diagram illustrating embodiments in a radio access network in a wireless communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a telecommunications system 100 in which embodiments herein may be implemented. The cellular communications system 100 is a wireless communication network such as a Wideband Code Division Multiple Access (WCDMA) network.

The telecommunications system 100 comprises a first network node 110. The core network node 110 is an Operations Support System for Radio & Core (OSS-RC) node. The first network node 110 may also be referred herein as a core network node. The first network node 110 may comprise, or be configured to be connected, to a data storage 111. The first network node 110 is configured with a Configuration Service (CS) feature arranged to configure a radio access network 101. The first network node 110 is also configured with a Neighboring Cell Support (NCS) feature, as described in the background section above.

The first network node 110 may also be arranged to be connected to one or more intermediary nodes 120, 121, 122 in the radio access network 101. The one or more intermediary nodes 120, 121, 122 are Radio Network Controller (RNC) nodes.

The intermediary nodes 120, 121, 122 are configured to serve one or more second network nodes 140, 141 in the radio access network 101. The second network nodes 140, 141 may be referred to as base stations. The second network nodes 140, 141 each serve a cell 130, 131, respectively. The second network nodes 140, 141 may in this example e.g. be an eNB, an eNodeB, or a Home Node B, a Home eNode B, a femto Base Station (BS), a pico BS or any other network unit capable to serve a user equipment or a machine type communication device which are located in the cell 130, 131, respectively, in the radio access network 101 in the telecommunications system 100.

A user equipment 160 is located within the cell 130. The user equipment 160 is configured to communicate within the telecommunications system 100 via the network node 140 over a radio link 150 when the user equipment 160 is present in the cell 130 served by the second network node 140. The user equipment 160 may e.g. be a mobile terminal, a wireless terminal, a mobile phone, a computer such as e.g. a laptop, a Personal Digital Assistant (PDA) or a tablet computer, sometimes referred to as a surf plate, with wireless capability, a device equipped with a wireless interface, such as a printer or a file storage device or any other radio network unit capable of communicating over a radio link in a telecommunications system.

Figure 2:
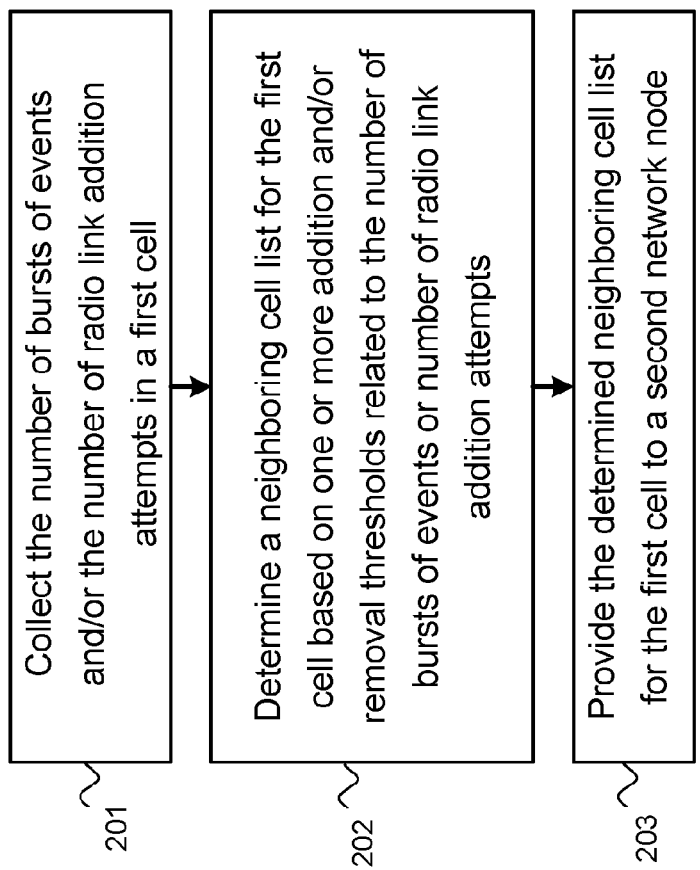
FIG. 2 is a flowchart depicting embodiments of a method in a network node.

Embodiments of a method in the first network node 110 will now be described with reference to the flowchart depicted in FIG. 2. The flowchart in FIG. 2 describes a method in a first network node 110 for providing a neighboring cell list for a first cell 130 in a wireless telecommunications network 100. The first cell 130 is served by at least one second network node 140, 141 connected to the first network node 110. It should be noted that the exemplary embodiment described below in reference to a first cell 130 may be performed for any number of, or all, cells in the radio access network 101.

Action 201

When collecting data for a first cell 130, the first network node 110 collects information about a number of bursts of events and/or a number of radio link addition attempts for user equipments located in the first cell 130, e.g. the user equipment 160 in FIG. 1, to one or more cells other than the first cell 130, e.g. cell 131 in FIG. 1. The first network node 110 may continually collect this information from the intermediary node (RNC) 120 serving the first cell 130.

The information about the number of bursts of events and/or a number of radio link addition attempts may be collected by the first network node 110 for one or more recording periods scheduled by the NCS feature in the first network node 110. The recording period is specified in an NCS recording definition window. The NCS recording definition window may comprise a recording name, a time schedule for the recording, a set of cells to be included in the recording, and a selection of General Performance Event Handling (GPEH) events, counters or both. The time schedule determines the days of the week the recording will be executed and the number of times the time schedule is repeated. Each period of data collection and active recording may be referred to as a recording period. The time limit for one recording period, or from the start of the first recording period to the end of the last recording period, is 24 hours.

Herein, the number of bursts of events refers to the total group of events for a soft handover event that is collected by the General Performance Event Handling (GPEH) function from the user equipments in the first cell 130 for one or more recording periods. Sometimes there may be several events registered for the same soft handover event, wherein registering the burst of events ensures that a single handover event is only counted once. The events may be the missing neighbour event INTERNAL_SOHO_DS_MISSING-_NEIGHBORS as defined by the GPEH function. These events occur only for undefined neighboring cells of the first cell 130, i.e. cells that are not defined in the current neighboring cell list for the first cell 130.

Thus, the number of bursts of events provides an estimate of the number of radio link addition attempts that this neighboring cell relation would have if it were defined in the neighboring cell list for the first cell 130.

Therefore, the number of burst of events is hereinafter referred to as "possible number of radio link addition attempts" and denoted "Possible RlAddAtt".

Furthermore, the number of radio link addition attempts refers herein to the total number of soft handover signalling attempts made by the user equipments in the first cell 130 to another cell, e.g. the cell 131 in FIG. 1, for the one or more recording periods. These soft handover signalling attempts occur only for defined neighboring cells of the first cell 130, i.e. cells that are defined in the current neighboring cell list for the first cell 130. Hereinafter, the number of radio link addition attempts is denoted "RlAddAtt".

Additionally, the first network node 110 may also collect information about the number of radio link addition attempts for user equipments located in the first cell 130 to one or more cells other than the first cell 130 that was successful, i.e. the cases where a successful soft handover to a neighboring cell from the first cell 130 was made. This may also be performed for the one or more recording periods scheduled by the NCS feature in the first network node 110.

This collection may be performed in order to detect when neighboring cell relations defined in the neighboring cell list for the first cell 130 should be removed from the neighboring cell list for the first cell 130.

Action 202

In this action, the first network node 110 determines a neighboring cell list for the first cell 130. This is performed based on one or more addition and/or removal thresholds related to the number of bursts of events and/or the number of radio link addition attempts for user equipments located in the first cell 130 to one or more cells other than the first cell 130, i.e. the information collected in Action 201.

By using determined addition and/or removal thresholds, the first network node 110 is able to determine which neighboring cell relations that are to be comprised in the neighboring cell list for the first cell 130 in a predictable, consistent and uniform manner without any operator involvement. This also means that the first network node 110 is able to generate and continuously update the neighboring cell list for the first cell 130 with properly defined neighboring cell relations.

An example of how the addition and removal thresholds may be determined is described in more detail below in reference to FIGS. 8-9.

In case a neighboring cell list for the first cell 130 is empty, i.e. comprises no defined neighboring cell relations or do not exist, the first network node 110 may determine the neighboring cell list by adding neighboring cell relations to the empty neighboring cell list. Exemplary embodiments describing how the addition of a neighboring cell relation may be performed by the first network node 110 are described in more detail below in reference to FIGS. 4-5.

In case a previous neighboring cell list for the first cell 130 already exist, i.e. a neighboring cell list comprising one or more defined neighboring cell relations, the first network node 110 may determine the neighboring cell list by first removing neighboring cell relations from the previous neighboring cell list. Exemplary embodiments describing how the removal of a neighboring cell relation may be performed by the first network node 110 is described in more detail below in reference to FIGS. 6-7.

Then, after the removal of neighboring cell relations from the previous neighboring cell list, the first network node 110 may add neighboring cell relations to the previous neighboring cell list. This may be performed in the same manner as described for the empty neighboring cell list above. This is performed in order to simplify the procedure and avoid unnecessary processing steps by removing unsuccessful neighboring cell relations from the neighboring cell list before new neighboring cell relations are added.

Action 203

When the neighboring cell list for the first cell 130 has been determined in Action 202, the first network node 110 may provide the determined neighboring cell list for the first cell 130 to the second network node 140 serving the first cell 130. This may be performed by the Configuration Service (CS) feature in a Configuration Management (CM) feature in the first network node 110. It may also be performed via the intermediary network node 120. Thus, the second network node 140 may be provided with and use an updated and properly configured neighboring cell list for the first cell 130.

Figure 3:
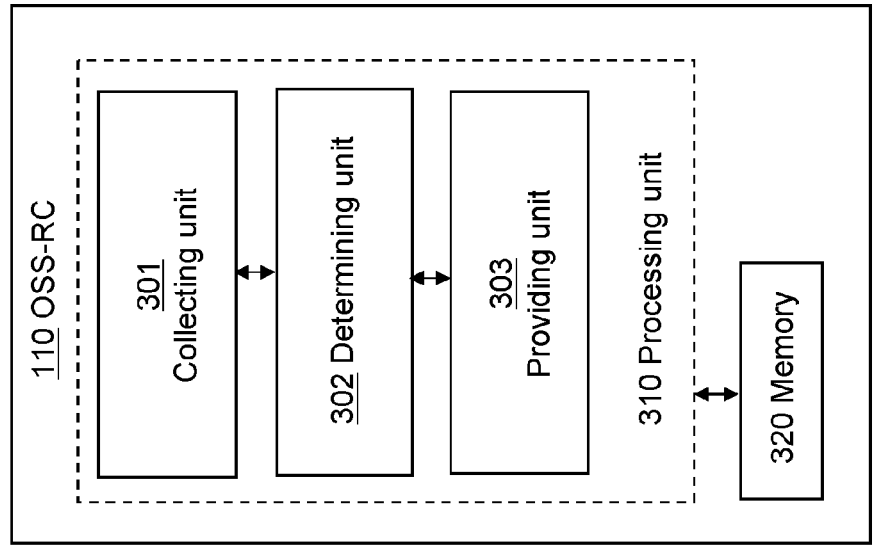
FIG. 3 is a block diagram depicting embodiments of a network node.

To perform the method actions for providing a neighboring cell list for a first cell 130 in a wireless telecommunications network 100, first network node 110 comprises the following arrangement depicted in FIG. 3. FIG. 3 shows a schematic block diagram of embodiments of the first network node 110. It should be noted that the exemplary embodiment described below in reference to a first cell 130 may be performed for any number of, or all, cells in the radio access network 101.

As mentioned above, the first cell 130 is served by at least one second network node 140,141 connected to the first network node 110.

The first network node 110 comprises a processing unit 310, which may also be referred to as processing circuitry. The processing unit 310 is configured with a Configuration Service (CS) feature and a Neighboring Cell Support (NCS) feature. The first network node 110, or the processing unit 310 in the first network node 110, may comprise a collecting unit 301, a determining unit 302 and a providing unit 303.

The collecting unit 301 is configured to collect information about a number of bursts of events and/or a number of radio link addition attempts for user equipments located in the first cell 130 to one or more cells other than the at least one first cell 130. The collecting unit 301 may also be configured to collect the number of successful radio link addition attempts to the second cell for user equipments located in the at least one first cell 130.

The determining unit 302 is configured to determine a neighboring cell list for the first cell 130 based on one or more addition and/or removal thresholds related to the number of bursts of events and/or number of radio link addition attempts for user equipments located in the at least one first cell 130 to one or more cells other than the first cell 130. An example of how the addition and removal thresholds may be determined by the determining unit 302 is described in more detail below in reference to FIGS. 8-9.

In case a neighboring cell list for the first cell 130 is empty, i.e. comprises no defined neighboring cell relations, the determining unit 302 may determine the neighboring cell list by adding neighboring cell relations to the empty neighboring cell list. Exemplary embodiments describing how the addition of a neighboring cell relation may be performed by the determining unit 302 are described in more detail below in reference to FIGS. 4-5.

In case a previous neighboring cell list for the first cell 130 already exist, i.e. a neighboring cell list comprising one or more defined neighboring cell relations, the determining unit 302 may determine the neighboring cell list by first removing neighboring cell relations from the previous neighboring cell list. Exemplary embodiments describing how the removal of a neighboring cell relation may be performed by the determining unit 302 is described in more detail below in reference to FIGS. 6-7.

Then, after the removal of neighboring cell relations from the previous neighboring cell list, the determining unit 302 may add neighboring cell relations to the previous neighboring cell list. This may be performed in the same manner as described for the empty neighboring cell list above.

The providing unit 303 configured to provide the determined neighboring cell list for the first cell 130 to the second network node 140, 141 serving the first cell 130.

The embodiments herein for providing a neighboring cell list for at least one first cell 130 may be implemented through one or more processors, such as the processing unit 310 in the first network node 110 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the first network node 110. One such carrier may be in the form of a CD ROM disc. It is however feasible with other data carriers such as a memory stick. The computer program code may furthermore be provided as pure program code on a server and downloaded to the first network node 110.

The first network node 110 may further comprise a memory 320 comprising one or more memory units. The memory 320 may be arranged to be used to store data, such as, e.g. information regarding the one or more intervals at which the energy of the transmission bursts should be increased to the second energy level, to perform the methods herein when being executed in the first network node 110.

Those skilled in the art will also appreciate that the processing unit 310 and the memory 320 described above may refer to a combination of analog and digital circuits, and/or one or more processors configured with software and/or firmware, e.g. stored in a memory, that when executed by the one or more processors such as the processing unit 310 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

It should also be noted that the first network node 110 may be configured to be connected to the second network node 140, 141 via an intermediary network node 120, 121, 122. The first network node may be an Operations Support System for Radio & Core, OSS-RC, node 110. The intermediary node may be a Radio Network Controller, RNC, node 120, 121, 122. The second network node may be a Radio Base Station, RBS, node 140, 141.

Exemplary embodiments describing how the addition of a neighboring cell relation may be performed by the first network node 110 will now be described with reference to the flowcharts depicted in FIG. 4. The flowchart in FIG. 4 describes an illustrative example of how the first network node 110 may use addition thresholds to determine if a neighboring cell relation should be comprised in the neighboring cell list of the at least one first cell 130. This may be performed by the determining unit 302 and/or the processing unit 310 in the first network node 110.

The method may comprise the following actions, which actions may be taken in any suitable order or combination. It should also be appreciated that the actions or operations illustrated below are merely examples, thus it is not necessary for all the actions or operations to be performed. It should also be noted that the exemplary embodiments described below in reference to a first cell 130 may be performed for any number of, or all, cells in the radio access network 101.

Action 401

For a first cell 130, the first network node 110 may retrieve the information for the first cell 130 collected as described in Action 201. Thus, the first network node 110 may retrieve the possible number of radio link addition attempts, "Possible RIAddAtt", for user equipments located in the first cell 130 to other neighboring cells that have been recorded for a particular recording period scheduled by the NCS feature in the first network node 110. That is, the number of bursts of events for the first cell 130.

Thus, the first network node 110 is made aware of new, possibly significant neighboring cell relations for the first cell 130.

Action 402

In order to deal with the most significant new neighboring cell relation for the first cell 130 first, the first network node 110 may sort the neighboring cell relations for the first cell 130. The neighboring cell relations for the first cell 130 may e.g. be sorted based on the highest number of "Possible RIAddAtt".

Action 403

In some embodiments, the thresholds for addition of a neighboring cell relation to the neighboring cell list for the first cell 130 may here be selected as described below in reference to FIG. 9. Alternatively, only a set of addition thresholds are set as default values. The addition thresholds, or sets of addition thresholds, may be configured manually in the first network node 110, or be comprised in the first network node 110.

Action 404

Here, the first network node 110 may select a neighboring cell relation. In some embodiments, this may be the neighboring cell relation with the highest number of "Possible RIAddAtt" or the neighboring cell relation on the top of the sorted neighboring cell relations described in Action 402. This ensures that the most important neighboring cell relation is handled first.

Action 405

In this action, the first network node 110 may determine if the selected neighboring cell relation is a good neighboring cell relation. The first network node 110 may determine if the selected neighboring cell relation is good or not as described below in reference to FIG. 5. If the first network node 110 determines that the selected neighboring cell relation is a good neighboring cell relation, the first network node 110 proceeds to Action 406.

If, however, the first network node 110 determines that the selected neighboring cell relation is not a good neighboring cell relation, the first network node 110 proceeds to Action 411.

Action 406

In this action, the first network node 110 may check if a backward neighboring cell relation is comprised in the neighboring cell list for the target cell in the good neighboring cell relation. In the good neighboring cell relation, the target cell is the neighboring cell to which the soft handovers was attempted by user equipments from the first cell 130. This may be performed in order to determine if the good neighboring cell relation should also be added to the neighboring cell list for the target cell in the good neighboring cell relation, i.e. in both directions. Additionally, the network node 110 may check if such a backward neighboring cell relation is blocked in the first network node 110, i.e. not allowed.

If yes to any one of these, then the first network node 110 may proceed to Action 407. If no, then the first network node 110 may proceed to Action 408.

In other words, the first network node 110 may check if the neighboring cell list for the cell comprises the first cell 130, i.e. if the cell relation is already defined therein, or backward relations between the cell and the first cell 130 is not allowed.

Action 407

In this action, the first network node 110 adds the target cell to the neighboring cell list of the first cell 130, i.e. indicates the good neighboring cell relation in the neighboring cell list of the first cell 130. The first network node 110 may then proceed to Action 410.

In some embodiments, the first network node 110 may check if the scrambling code of the target cell is the same as any one of the scrambling codes of the cells already comprised in the neighboring cell list for the first cell 130. If yes, then the first network node 110 may refrain from adding the target cell to the neighboring cell list of the first cell 130. This may be performed because the scrambling code is used to identify the neighboring cell, so having several neighboring cells transmitting on the same frequency with the same scrambling code would make it hard to uniquely identify all neighboring cells. This would also cause interference in the first cell.

Action 408

In this action, the first network node 110 may check if the number of cells on the neighboring cell list for the target cell is below a preferred number of cells for the neighboring cell list for the target cell. If yes, then the first network node 110 may proceed to Action 409. If no, then the first network node 110 may proceed to Action 407.

This may be performed in order to keep a preferred number of cells in the neighboring cell list for the target cell.

Action 409

In this action, the first network node 110 adds both the target cell to the neighboring cell list of the first cell 130 and the first cell 130 to the neighboring cell list of the target cell. The first network node 110 may then proceed to Action 410.

This may be performed since if the cell relation is good in one direction, i.e. from first cell 130 to the target cell, it is very likely also good in the other direction as well, i.e. from the target cell to the first cell 130. This may shorten the time it takes for the first network node 110 to configure the cells in the radio access network 101 in the wireless telecommunications network 100.

Action 410

In this action, the first network node 110 may recalculate the number of cells in the neighboring cell list of the first cell 130. This may also be referred to as updating the neighboring cell list of the first cell 130. The first network node 110 may then proceed to Action 411.

Action 411

In this action, the first network node 110 may select the next neighboring cell relation. In some embodiments, this may be the neighboring cell relation with the next highest number of "Possible RIAddAtt" or the neighboring cell relation below the previous relation of the sorted neighboring cell relations described in Action 402.

Figure 5:
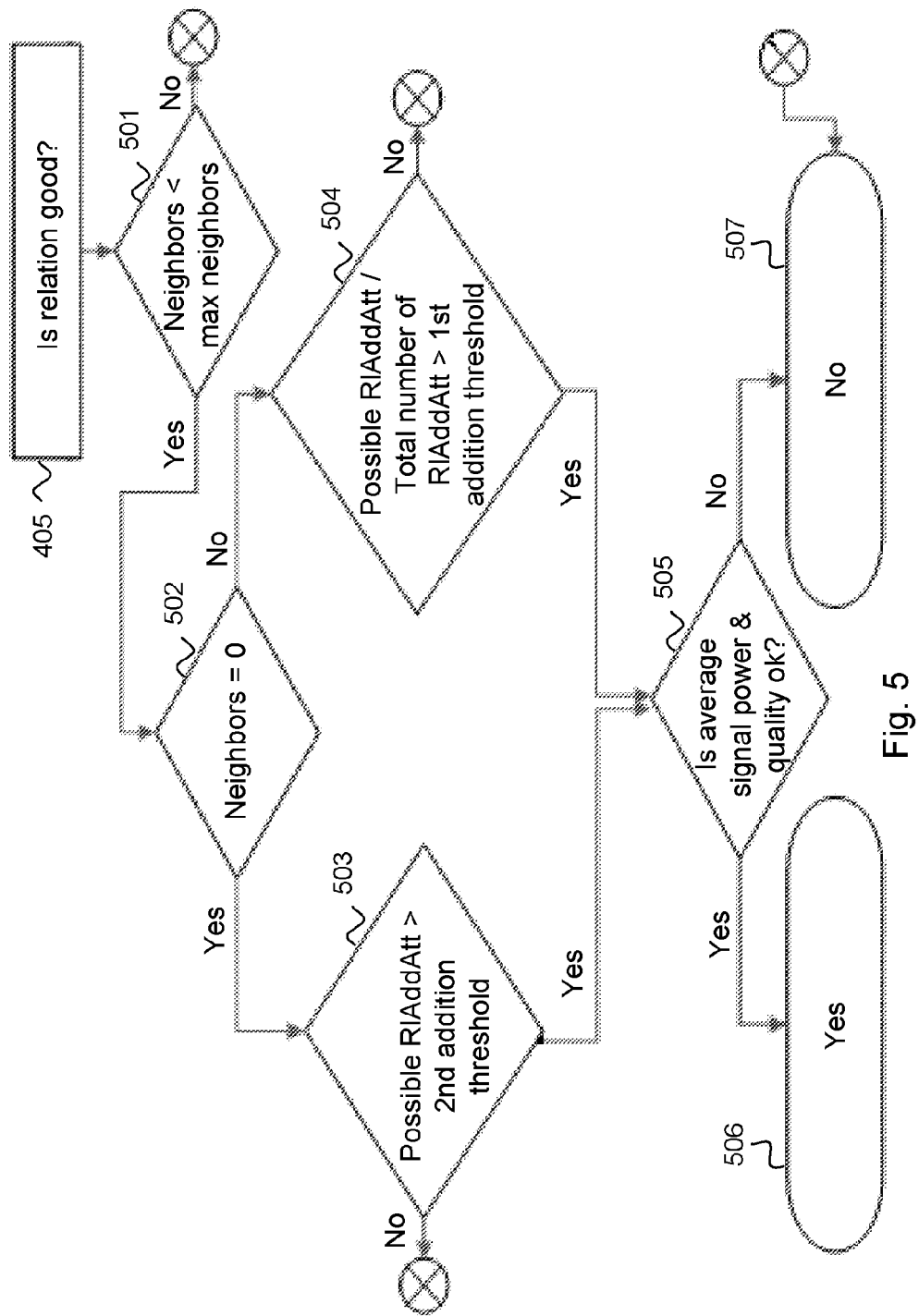

Exemplary embodiments describing how the first network node 110 determine if the selected neighboring cell relation is a good neighboring cell relation will now be described with reference to the flowcharts depicted in FIG. 5. This may also be performed by the determining unit 302 and/or the processing unit 310 in the first network node 110. The method may comprise the following actions, which actions may be taken in any suitable order or combination. It should also be appreciated that the actions or operations illustrated below are merely examples, thus it is not necessary for all the actions or operations to be performed.

Action 501

In this action, the first network node 110 may check if the number of cells in the neighboring cell list for the first cell 130 is below a preferred number of cells for the neighboring cell list for the first cell 130. If yes, then the first network node 110 may proceed to Action 502. If no, then the first network node 110 may proceed to Action 507.

This may be performed in order to keep a preferred number of cells in the neighboring cell list for the first cell 130.

Action 502

In this action, the first network node 110 may check if the neighboring cell list for the first cell 130 is empty, i.e. no neighboring cell list exist or the number of cells in the neighboring cell list is zero. If yes, then the first network node 110 may proceed to Action 503. Otherwise, in case of a previous neighboring cell list, i.e. there is one or more cells in a neighboring cell list, then the first network node 110 may proceed to Action 504.

This may be performed to achieve a different processing depending on if a previous neighboring cell list exists, or not, for the first cell 130.

Action 503

In some embodiments and when the neighboring cell list for the first cell 130 is empty, the first network node 110 may check if the number of bursts of events to the target cell for user equipments that are located in the first cell 130 is above a second addition threshold. This is because a number of burst of events that is above the second addition threshold may be indicative of that a large enough number of attempted soft handovers from the first cell to the target cell has been performed in order to add the target cell to the neighboring cell list for the first cell 130. Hence, the first network node 110 may determine that the target cell is suitable in this aspect and therefore could be added to the empty neighboring cell list for the first cell 130. Thus, if yes, then the first network node 110 may proceed to Action 505.

However, if no, then the first network node 110 may proceed to Action 507.

Action 504

In some embodiments and when there is a previous neighboring cell list for the first cell 130, the first network node 110 may check if the number of bursts of events to the target cell for user equipments located in the first cell 130 relative to the total number of radio link addition attempts to other cells on the previous neighboring cell list for the first cell 130 for user equipments located in the first cell 130, exceeds a first addition threshold. This is performed in order to relate the number of bursts of events to the total amount of soft handovers being performed from the first cell 130. This is advantageous because if e.g. the already defined neighboring cells in the neighboring cell list of the first cell 130 are not used to perform that many soft handovers, then the sum of the total amount of soft handovers will be low. This means that it will be easier to add the new neighboring cell to the neighboring cell list of the first cell 130. On the other hand, if the already defined neighboring cells in the neighboring cell list of the first cell 130 are used to perform a lot of soft handovers, then the sum of the total amount of soft handovers will be high. This means that it will be harder to add the new neighboring cell to the neighboring cell list of the first cell 130.

Hence, the first network node 110 may in this way determine that the target cell is suitable in this aspect and therefore could be added to the previous neighboring cell list for the first cell 130. Thus, if yes, then the first network node 110 may proceed to Action 505.

However, if no, then the first network node 110 may proceed to Action 507.

Action 505

In this action, the first network node 110 may check if the average signal power, such as, e.g. an average Radio Signal Code Power (RSCP), and the average signal quality, such as, e.g. an average Signal-to-Noise Ratio (SNR), for the target cell are above a first and a second signal threshold, respectively. This may performed as an additional quality control and to make sure that the target cell has a good enough signal that may potentially be used in a soft handover. Hence, the first network node 110 may in this way determine that the target cell is suitable in these aspects and therefore could be added to the empty or previous neighboring cell list for the first cell 130.

Thus, if yes, then the first network node 110 may proceed to Action 506. However, if no, then the first network node 110 may proceed to Action 507.

Action 506

Figure 4:
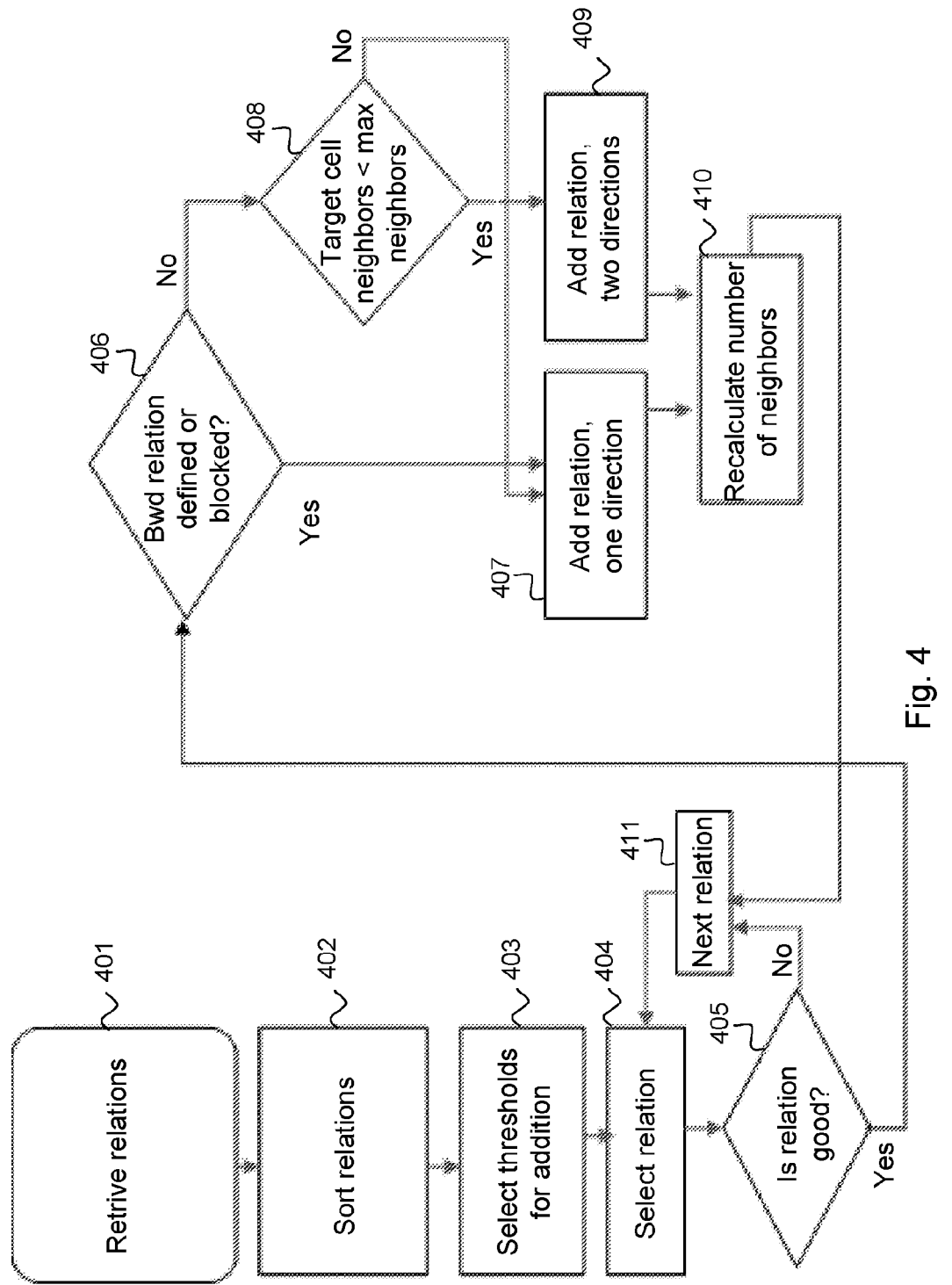

In this action, the first network node 110 may determine that the target cell is suitable for, and should be added to, the empty or previous neighboring cell list for the first cell 130, i.e. that the selected neighboring cell relation is good in Action 405 in FIG. 4.

Action 507

In this action, the first network node 110 may determine the target cell is not suitable for, and should not be added to, the empty or previous neighboring cell list for the first cell 130, i.e. that the selected neighboring cell relation is not good in Action 405 in FIG. 4.

Exemplary embodiments describing how the removal of a neighboring cell relation may be performed by the first network node 110 will now be described with reference to the flowcharts depicted in FIG. 6. The flowchart in FIG. 6 describes an illustrative example of how the first network node 110 may use removal thresholds to determine if a neighboring cell relation should be removed from the neighboring cell list of the at least one first cell 130. This may also be performed by the determining unit 302 and/or the processing unit 310 in the first network node 110.

The method may comprise the following actions, which actions may be taken in any suitable order or combination. It should also be appreciated that the actions or operations illustrated below are merely examples, thus it is not necessary for all the actions or operations to be performed.

It should also be noted that the exemplary embodiments described below in reference to a first cell 130 may be performed for any number of, or all, cells in the radio access network 101.

Action 601

For a first cell 130, the first network node 110 may retrieve the information for the first cell 130 collected as described in Action 201. Thus, the first network node 110 may retrieve the number of radio link addition attempts, "RIAddAtt", for user equipments located in the first cell 130 to another cell for one or more recording periods.

Additionally, the first network node 110 may also retrieve information about the number of radio link addition attempts for user equipments located in the first cell 130 to one or more cells other than the first cell 130 that was successful, i.e. the number of successful radio link addition attempts to defined neighboring cells in the neighboring cell list of the first cell 130.

Thus, the first network node 110 is made aware of popularity and success of the defined neighboring cell relations in the neighboring cell list for the first cell 130.

Action 602

In order to deal with the most significant defined neighboring cell relation for the first cell 130 first, the first network node 110 may sort the neighboring cell relations for the first cell 130. The neighboring cell relations for the first cell 130 may e.g. be sorted based on the highest number of "RIAddAtt".

Action 603

In some embodiments, the thresholds for removal of a neighboring cell relation in the neighboring cell list for the first cell 130 may here be selected as described below in reference to FIG. 8. Alternatively, only one set of removal thresholds are set as default values. The removal thresholds, or sets of removal thresholds, may be configured manually in the first network node 110, or be comprised in the first network node 110 to be used upon launch or start-up.

Action 604

In this action, the first network node 110 selects a defined neighboring cell relation. In some embodiments, this may be the defined neighboring cell relation with the highest number of "RIAddAtt" or the neighboring cell relation on the top of the sorted neighboring cell relations described in Action 602.

Action 605

In this action, the first network node 110 may determine if the selected defined neighboring cell relation is a bad neighboring cell relation. The first network node 110 may determine if the selected neighboring cell relation is bad or not as described below in reference to FIG. 7. If the first network node 110 determines that the selected defined neighboring cell relation is a bad neighboring cell relation, the first network node 110 proceeds to Action 614.

If, however, the first network node 110 determines that the selected defined neighboring cell relation is not a bad neighboring cell relation, the first network node 110 proceeds to Action 606.

Action 606

To determine if the bad neighboring cell relation should also be removed from the neighboring cell list for the target cell in the bad neighboring cell relation, i.e. the neighboring cell to which the soft handover was performed from the first cell 130, the first network node 110 may check if such a backward neighboring cell relation exists, i.e. the first cell 130 is comprised in the neighboring cell list for the target cell.

If no, then the first network node 110 may proceed to Action 607. If yes, then the first network node 110 may proceed to Action 608.

Action 607

In this action, the first network node 110 removes the target cell from the neighboring cell list of the first cell 130, i.e. removes the indication of neighboring cell relation in the neighboring cell list of the first cell 130. The first network node 110 may then proceed to Action 613.

Action 608

In this action, the first network node 110 may check if the existing backward (bwd) neighboring cell relation is defined as needed, i.e. should not be removed, and/or if the number of "RIAddAtt" for user equipments located in the target cell to the first cell 130 is below a fourth removal threshold. This may be performed in order to ensure that important neighboring cell relations are not removed from the neighboring cell list for the target cell. If yes, then the first network node 110 may proceed to Action 612.

If no, then the first network node 110 may proceed to Action 609.

Action 609

In some embodiments, the thresholds for removal of a backward neighboring cell relation in the neighboring cell list for the target cell may here be selected as described below in reference to FIG. 8. Alternatively, only one set of removal thresholds are set as default values. The removal thresholds, or sets of removal thresholds, may be configured manually in the first network node 110, or be comprised in the first network node 110 to be used upon launch or start-up.

Action 610

In the same manner as in Action 605, the first network node 110 may determine if the backward neighboring cell relation is bad. The first network node 110 may determine if the backward neighboring cell relation is bad or not as described below in reference to FIG. 7. If the first network node 110 determines that the backward neighboring cell relation is a bad neighboring cell relation, the first network node 110 proceeds to Action 611.

If, however, the first network node 110 determines that the backward defined neighboring cell relation is not a bad neighboring cell relation, the first network node 110 proceeds to Action 612.

Action 611

In this action, the first network node 110 removes both the target cell from the neighboring cell list of the first cell 130 and the first cell 130 from the neighboring cell list of the target cell. The first network node 110 then proceeds to Action 613.

This may be performed since if the cell relation is bad in one direction, i.e. from first cell 130 to the target cell, it is very likely also bad in the other direction as well, i.e. from the target cell to the first cell 130. This may shorten the time it takes for the first network node 110 to configured the cells in the radio access network 101 in the wireless telecommunications network 100.

Action 612

In this action, the first network node 110 may determine if removal in only one direction from the first cell to the target cell is allowed, i.e. removal of only the target cell in the neighboring cell list of the first cell 130. In some embodiments, this may be allowed or not allowed depending on the preferred configuration in the wireless telecommunications network 100. If yes, then the first network node 110 may proceed to Action 607.

If no, then the first network node 110 may proceed to Action 614.

Action 613

In this action, the first network node 110 may recalculate the number of cells in the neighboring cell list of the first cell 130. This may also be referred to as updating the neighboring cell list of the first cell 130. The first network node 110 may then proceed to Action 614.

Action 614

In this action, the first network node 110 may select the next neighboring cell relation. In some embodiments, this may be the neighboring cell relation with the next highest "RIAddAtt" or the neighboring cell relation below the previous relation of the sorted neighboring cell relations described in Action 402. In this way, all defined neighboring cell relations may be checked for possible removal from the neighboring cell list of the first cell 130.

Figure 7:
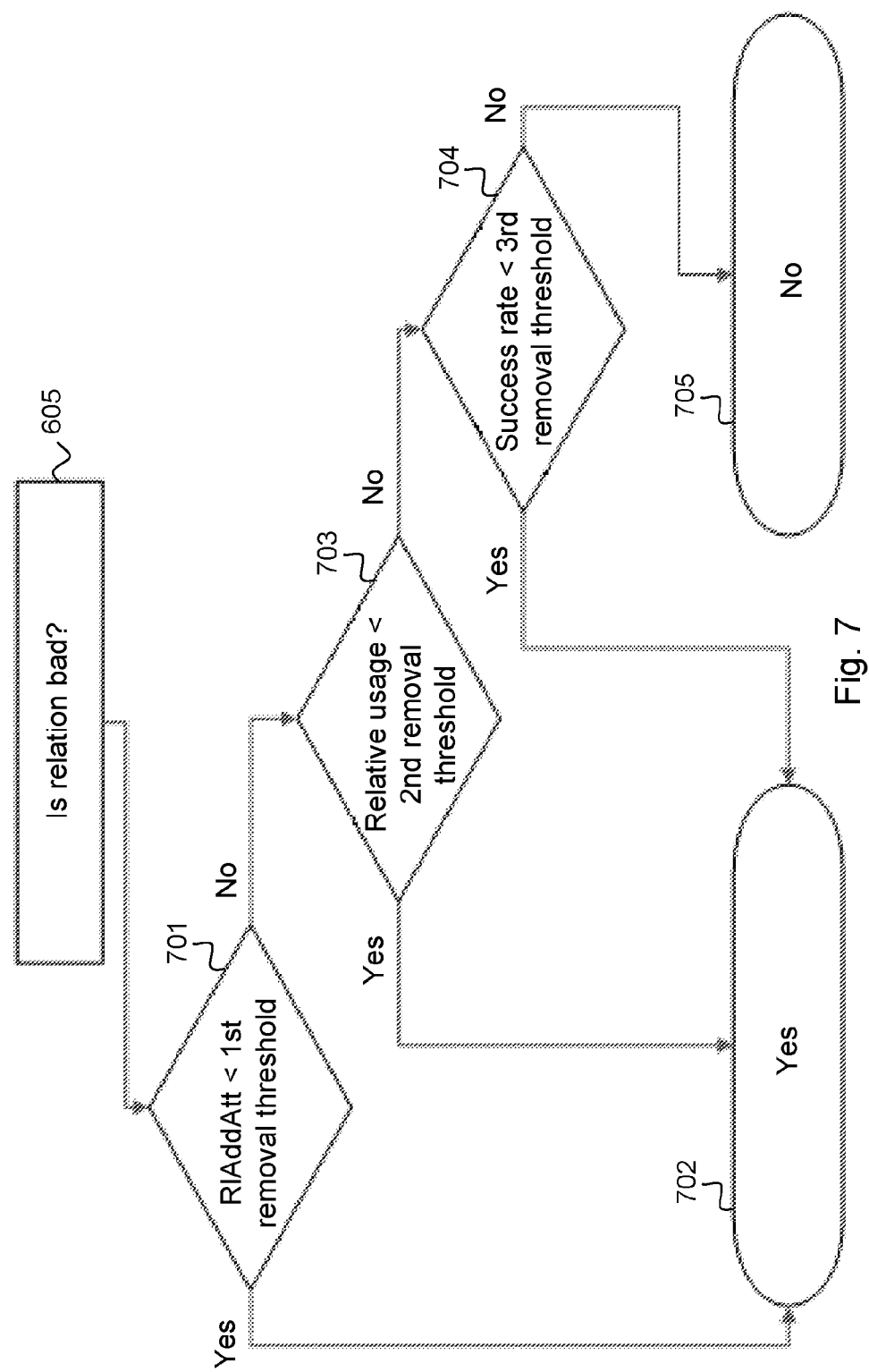

Exemplary embodiments describing how the first network node 110 determine if the selected neighboring cell relation is a bad neighboring cell relation will now be described with reference to the flowcharts depicted in FIG. 7. This may also be performed by the determining unit 302 and/or the processing unit 310 in the first network node 110. The method may comprise the following actions, which actions may be taken in any suitable order or combination. It should also be appreciated that the actions or operations illustrated below are merely examples, thus it is not necessary for all the actions or operations to be performed.

Action 701

In this action, the first network node 110 may check if the number of "RIAddAtt" for user equipments located in the first cell 130 to the target cell is below a first removal threshold. If yes, then the first network node 110 may proceed to Action 702. If no, then the first network node 110 may proceed to Action 703.

This may be performed since the number of "RIAddAtt" for the neighboring cell relation is indicative of how important it is to have the target cell in the neighboring cell list for the first cell 130.

Action 702

Figure 6:
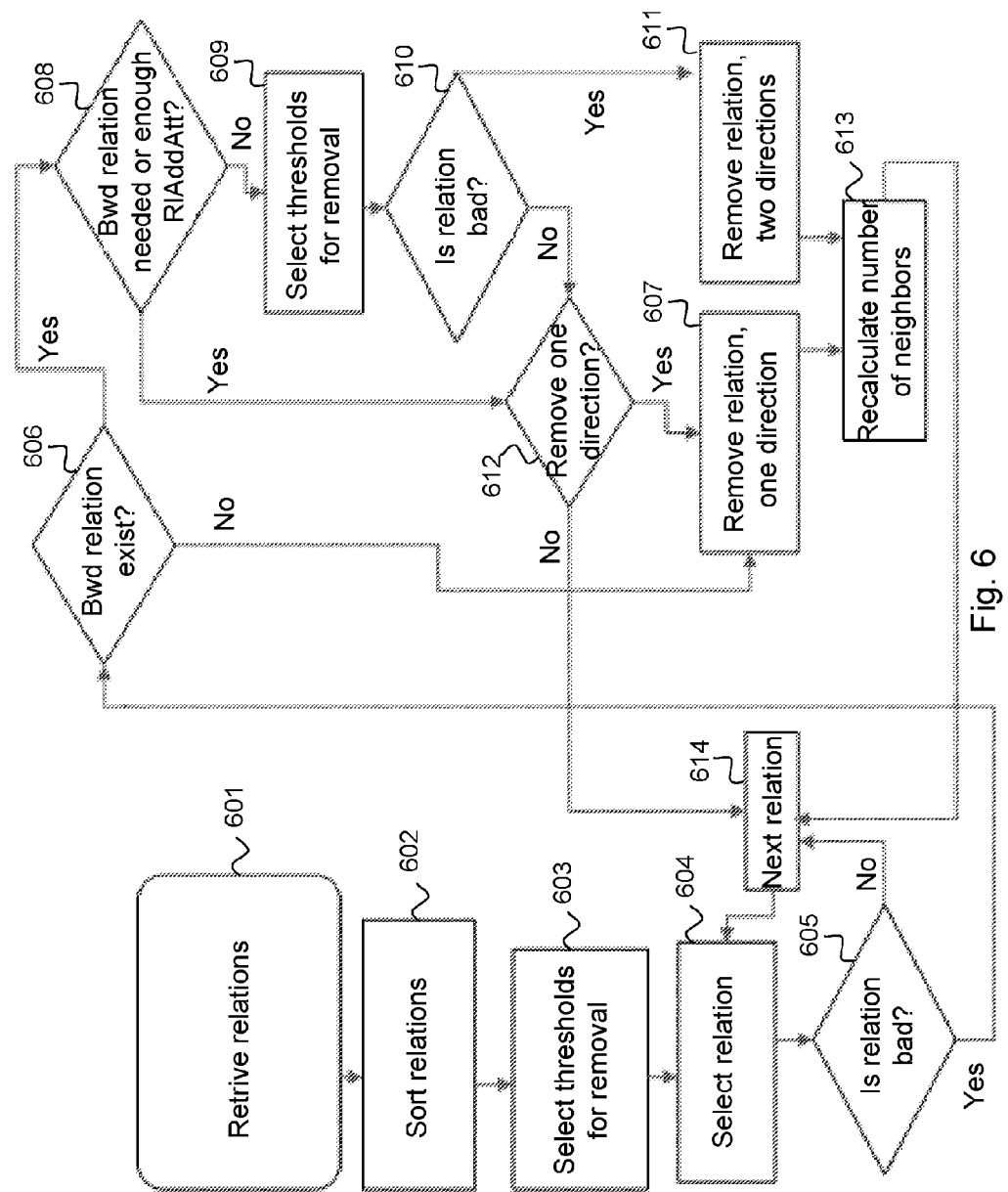

In this action, the first network node 110 may determine that the target cell is not suitable for, and should therefore be removed from, the neighboring cell list of the first cell 130, i.e. that the selected neighboring cell relation is bad in Action 605 in FIG. 6. Alternatively, the first network node 110 may determine that the first cell is not suitable for, and should therefore be removed from, the neighboring cell list of the target cell, i.e. that the backward neighboring cell relation is bad in Action 610 in FIG. 6.

Action 703

In this action, the first network node 110 may check if the number of radio link addition attempts to the target cell for user equipments located in the first cell 130 relative to the total number of radio link addition attempts to other cells for user equipments located in the first cell 130, i.e. relative usage, exceeds a second removal threshold. If yes, then the relative usage is below an acceptable level. It should be noted that herein, the term "exceed" may mean exceed above or exceed below a particular threshold depending on the configuration of the threshold in the first network node 110. Then, the first network node 110 may proceed to Action 702.

If no, then the first network node 110 may proceed to Action 704.

Action 704

In this action, the first network node 110 may check if the number of radio link addition attempts to the target cell for user equipments located in the first cell 130 relative to the number of successful radio link addition attempts to the target cell for user equipments located in the first cell 130 exceeds a third removal threshold.

If yes, then the success rate is below an acceptable level. Then, the first network node 110 may proceed to Action 702.

If no, then the first network node 110 may proceed to Action 704.

Action 705

In this action, the first network node 110 may determine that the target cell is suitable for, and should therefore not be removed from, the neighboring cell list of the first cell 130, i.e. that the selected neighboring cell relation is not bad in Action 605 in FIG. 6. Alternatively, the first network node 110 may determine that the first cell is suitable for, and should therefore not be removed from, the neighboring cell list of the target cell, i.e. that the backward neighboring cell relation is not bad in Action 610 in FIG. 6.

Exemplary embodiments describing how the first network node 110 select thresholds for removal will now be described with reference to the flowchart depicted in FIG. 8. This may also be performed by the determining unit 302 and/or the processing unit 310 in the first network node 110. The method may comprise the following actions, which actions may be taken in any suitable order or combination. It should also be appreciated that the actions or operations illustrated below are merely examples, thus it is not necessary for all the actions or operations to be performed.

Action 801

In this action, the first network node 110 may check if the number of cells on the neighboring cell list for the first cell 130 is above a preferred number of cells for the neighboring cell list for the first cell 130. If yes, then the first network node 110 may proceed to Action 802. If no, then the first network node 110 may proceed to Action 803.

This may be performed to achieve a different processing depending on the number of cells in the neighboring cell list for the first cell 130.

Action 802

In this case, since the number of cells in the neighboring cell list for the first cell 130 is below the preferred number of cells, i.e. comprises a lot of cells, the first network node 110 may select a first set of less restrictive parameters or values for the first, second, third, and fourth removal thresholds, i.e. a first set of the first and second removal thresholds. This may be performed in order to increase the removal rate of cells in the neighboring cell list for the first cell 130, and to try and keep the number of cells in the neighboring cell list at a preferred level.

It should be noted that less restrictive parameters or values are parameters or values that sets a limit that is lower than e.g. a default parameter or value, such that more neighboring cell relations exceed the limit and thus will be removed from the neighboring cell list, as compared to when using e.g. the default parameter or value.

Action 803

In this case, since the number of cells in the neighboring cell list for the first cell 130 is below the preferred number of cells, i.e. comprises only a few cells, the first network node 110 may select a set of more restrictive parameters or values for the first, second, third, and fourth removal thresholds, i.e. a second set of the first and second removal thresholds. This may be performed in order to decrease the removal rate of cells in the neighboring cell list for the first cell 130, and to try and keep the number of cells in the neighboring cell list at a preferred level.

It should be noted that more restrictive parameters or values are parameters or values that sets a limit that is higher than e.g. a default parameter or value, such that less neighboring cell relations exceed the limit and thus will not be removed from the neighboring cell list, as compared to when using e.g. the default parameter or value.

Exemplary embodiments describing how the first network node 110 select thresholds for addition will now be described with reference to the flowchart depicted in FIG. 9. This may also be performed by the determining unit 302 and/or the processing unit 310 in the first network node 110. The method may comprise the following actions, which actions may be taken in any suitable order or combination. It should also be appreciated that the actions or operations illustrated below are merely examples, thus it is not necessary for all the actions or operations to be performed.

Action 901

In this action, the first network node 110 may check if the number of cells on the neighboring cell list for the first cell 130 is above a preferred number of cells for the neighboring cell list for the first cell 130. If yes, then the first network node 110 may proceed to Action 802. If no, then the first network node 110 may proceed to Action 803.

This may be performed to achieve a different processing depending on the number of cells in the neighboring cell list for the first cell 130.

Action 902

In this case, since the number of cells in the neighboring cell list for the first cell 130 is below the preferred number of cells, i.e. comprises a lot of cells, the first network node 110 may select a set of more restrictive parameters or values for the first and second addition thresholds, i.e. a first set of the first and second addition thresholds. This may be performed in order to decrease the addition rate of cells in the neighboring cell list for the first cell 130, and to try and keep the number of cells in the neighboring cell list at a preferred level.

It should be noted that more restrictive parameters or values are parameters or values that sets a limit that is higher than e.g. a default parameter or value, such that less neighboring cell relations exceed the limit and thus will not be added to the neighboring cell list, as compared to when using e.g. the default parameter or value.

Action 903

In this case, since the number of cells in the neighboring cell list for the first cell 130 is below the preferred number of cells, i.e. comprises only a few cells, the first network node 110 may select a set of less restrictive parameters for the first and second addition thresholds, i.e. a second set of the first and second addition thresholds. This may be performed in order to increase the addition rate of cells in the neighboring cell list for the first cell 130, and to try and keep the number of cells in the neighboring cell list at a preferred level.

It should be noted that less restrictive parameters or values are parameters or values that sets a limit that is lower than e.g. a default parameter or value, such that more neighboring cell relations exceed the limit and thus will be added to the neighboring cell list, as compared to when using the default parameter or value.

The embodiments herein are not limited to the above described preferred embodiments. Various alternatives, modifications and equivalents may be used. Therefore, the above embodiments should not be construed as limiting.

ABBREVIATIONS

CM Configuration Management
CS Configuration Service
GPEH General Performance Event Handling
NCS Neighboring Cell Support
NCS-W Neighboring Cell Support for WCDMA
OSS Operations Support System
OSS-RC Operations Support System for Radio & Core
RSCP Received Signal Code Power
SNR Signal-to-Noise Ratio
SOHO Soft Handover
WCDMA Wideband Code Division Multiple Access
WRAN Wideband Radio Access Network

The invention claimed is:

1. A first network node for providing a neighboring cell list for at least one first cell in a wireless telecommunications network, which at least one first cell is served by at least one second network node connected to the first network node, wherein the first network node comprises:

a collecting unit configured to collect information about a number of bursts of soft handover events and/or a number of radio link addition attempts for user equipments located in the at least one first cell to one or more cells other than the at least one first cell, the number of bursts of soft handover events comprising a total number of events for a soft handover event that is collected by a General Performance Event Handling (GPEH)

function from the users equipments in the first cell for one or more recording periods;

a determining unit configured to determine a neighboring cell list for the at least one first cell based on one or more addition and/or removal thresholds related to the number of bursts of soft handover events and/or the number of radio link addition attempts for user equipments located in the at least one first cell to one or more cells other than the at least one first cell; and a providing unit configured to provide the neighboring cell list for the at least one first cell to the second network node serving the at least one first cell.

2. The first network node according to claim 1, wherein the determining unit is further configured to remove a second cell from a previous neighboring cell list for the at least one first cell based on determining that the number of radio link addition attempts to the second cell for user equipments located in the at least one first cell is below a first removal threshold.

3. The first network node according to claim 2, wherein the determining unit is further configured to remove the second cell from the previous neighboring cell list for the at least one first cell based on determining that the number of radio link addition attempts to the second cell for user equipments located in the at least one first cell relative to a total number of radio link addition attempts to other cells for user equipments located in the at least one first cell is greater than a second removal threshold.

4. The first network node according to claim 3, wherein the collecting unit is further configured to collect a number of successful radio link addition attempts to the second cell for user equipments located in the at least one first cell, and wherein the determining unit is further configured to remove the second cell from the previous neighboring cell list for the at least one first cell based on determining that the number of radio link addition attempts to the second cell for user equipments located in the at least one first cell relative to the number of successful radio link addition attempts to the second cell for user equipments located in the at least one first cell is greater than a third removal threshold.

5. The first network node according to claim 2, wherein the determining unit is further configured to use a first set of removal thresholds based on a number of cells on the previous neighboring cell list being above a preferred number of cells for a neighboring cell list, and use a second set of removal thresholds based on the number of cells on the previous neighboring cell list being below a preferred number of cells for a neighboring cell list, wherein the first set of removal thresholds are less restrictive than the second set of removal thresholds.

6. The first network node according to claim 2, wherein the determining unit is further configured to check, when the second cell is to be removed from the previous neighboring cell list for the at least one first cell, if a neighboring cell list for the second cell comprises the at least one first cell, and if so, remove the at least one first cell from the neighboring cell list for the second cell using selected removal thresholds unless a backward relation between the at least one first cell and the second cell is needed.

7. The first network node according to claim 1, wherein the determining unit is further configured to determine the neighboring cell list by adding a second cell to a previous neighboring cell list for the at least one first cell based on a number of bursts of soft handover events to the second cell for user equipments located in the at least one first cell relative to a total number of radio link addition attempts to other cells on the previous neighboring cell list for the at least one first cell for user equipments located in the at least one first cell exceeding an addition threshold.

8. The first network node according to claim 1, wherein the determining unit is further configured to add a second cell to an empty neighboring cell list for the at least one first cell based on a number of bursts of soft handover events to the second cell for user equipments located in the at least one first cell being above an addition threshold.

9. The first network node according to claim 7, wherein the determining unit is further configured to use a first set of addition thresholds if a number of cells on the previous neighboring cell list is above a preferred number of cells for a neighboring cell list, and use a second set of addition thresholds if the number of cells on the previous neighboring cell list is below the preferred number of cells for a neighboring cell list, wherein the first set of addition thresholds are more restrictive than the second set of addition thresholds.

10. The first network node according to claim 7, wherein the determining unit is further configured to check if the neighboring cell list for the second cell comprises the at least one first cell, and, if not, add the at least one first cell to the neighboring cell list for the second cell based on determining that a number of neighboring cells on the neighboring cell list for the second cell is below a threshold and based on determining that backward relations between cells are allowed.

11. The first network node according to claim 1, wherein the determining unit is further configured to refrain from adding a second cell to a previous neighboring cell list for the at least one first cell if a scrambling code of the second cell is identical to any one of the scrambling codes of the cells comprised in the previous neighboring cell list for the at least one first cell.

12. The first network node according to claim 1, wherein the number of bursts of soft handover events is a number of missing neighbor events.

13. The first network node according to claim 1, wherein the first network node is arranged to be connected to the second network node via an intermediary network node.

14. The first network node according to claim 13, wherein the first network node is an Operations Support System for Radio & Core(OSS-RC) node, the intermediary network node is a Radio Network Controller(RNC) node, and the second network node is a Radio Base Station (RBS) node.

15. A method in a first network node for providing a neighboring cell list for at least one first cell in a wireless telecommunications network, which at least one first cell is served by at least one second network node connected to the first network node, the method comprising:

collecting information about a number of bursts of soft handover events and/or a number of radio link addition attempts for user equipments located in the at least one first cell to one or more cells other than the at least one first cell, the number of bursts of soft handover events comprising a total number of events for a soft handover event that is collected by a General Performance Event Handling (GPEH) function from the users equipments in the first cell for one or more recording periods;

determining a neighboring cell list for the at least one first cell based on one or more addition and/or removal thresholds related to the number of bursts of soft handover events and/or the number of radio link addition attempts for user equipments located in the at least one first cell to one or more cells other than the at least one first cell; and providing the determined neighboring cell list for the at least one first cell to the second network node serving the at least one first cell.

16. The method according to claim 15, wherein the determining further comprises:
removing a second cell from a previous neighboring cell list for the at least one first cell if the number of radio link addition attempts to the second cell for user equipments located in the at least one first cell is below a first removal threshold.

17. The method according to claim 16, wherein the determining further comprises:
removing the second cell from the previous neighboring cell list for the at least one first cell if the number of radio link addition attempts to the second cell for user equipments located in the at least one first cell relative to a total number of radio link addition attempts to other cells for user equipments located in the at least one first cell is greater than a second removal threshold.

18. The method according to claim 17, wherein the collecting further comprises collecting a number of successful radio link addition attempts to the second cell for user equipments located in the at least one first cell; and wherein the determining further comprises removing the second cell from the previous neighboring cell list for the at least one first cell if the number of radio link addition attempts to the second cell for user equipments located in the at least one first cell relative to the number of successful radio link addition attempts to the second cell for user equipments located in the at least one first cell is greater than a third removal threshold.

19. The method according to claim 16, wherein the determining further comprises:
using a first set of removal thresholds based on a number of cells on the previous neighboring cell list being above a preferred number of cells for a neighboring cell list, and
using a second set of removal thresholds based on the number of cells on the previous neighboring cell list being below a preferred number of cells for a neighboring cell list,
wherein the first set of removal thresholds are less restrictive than the second set of removal thresholds.

20. The method according to claim 16, wherein, when the second cell is to be removed from the previous neighboring cell list for the at least one first cell, the determining further comprises:
checking if a neighboring cell list for the second cell comprises the at least one first cell; and
if so, removing the at least one first cell from the neighboring cell list for the second cell using selected removal thresholds, unless a backward relation between the at least one first cell and the second cell is needed.

21. The method according to claim 15, wherein the determining further comprises:
adding a second cell to a previous neighboring cell list for the at least one first cell, based on a number of bursts of soft handover events to the second cell for user equipments located in the at least one first cell relative to a total number of radio link addition attempts to other cells on the previous neighboring cell list for the at least one first cell for user equipments located in the at least one first cell, exceeding an addition threshold.

22. The method according to claim 15, wherein the determining further comprises:
adding a second cell to an empty neighboring cell list for the at least one first cell based on a number of bursts of soft handover events to the second cell for user equipments located in the at least one first cell being above an addition threshold.

23. The method according to claim 21, wherein the determining further comprises:
using, if a number of cells on the previous neighboring cell list is above a preferred number of cells for a neighboring cell list, a first set of addition thresholds, and
using, if the number of cells on the previous neighboring cell list is below the preferred number of cells for a neighboring cell list, a second set of addition thresholds,
wherein the first set of addition thresholds are more restrictive than the second set of addition thresholds.

24. The method according to claim 21, wherein the determining further comprises:
checking if a neighboring cell list for the second cell comprises the at least one first cell; and
if not, adding the at least one first cell to the neighboring cell list for the second cell based on determining that a number of neighboring cells on the neighboring cell list for the second cell is below a threshold and based on determining that backward relations between cells are allowed.

25. The method according to claim 15, wherein the determining further comprises:
refraining from adding a second cell to a previous neighboring cell list for the at least one first cell when a scrambling code of the second cell is identical to any one of the scrambling codes of the cells comprised in the previous neighboring cell list for the at least one first cell.

26. The method according to claim 21, wherein the number of bursts of soft handover events is a number of missing neighbor events.

27. The method according to claim 15, wherein the first network node is arranged to be connected to the second network node via an intermediary network node, wherein the first network node is an Operations Support System for Radio & Core (OSS-RC) node, the intermediary network node is a Radio Network Controller (RNC) node, and the second network node is a Radio Base Station (RBS) node.

28. A method in a first network node for providing a first cell in a wireless telecommunications network with a list of neighboring cells, wherein the first cell is served by at least one second network node connected to the first network node, wherein a second cell is served by at least one third network node connected to the first network node, the method comprising:
collecting information about a number of bursts of missing neighbor events and a number of soft handover signalling attempts for user equipments located in the first cell to one or more cells other than the first cell;
determining a neighboring cell list for the first cell, wherein the determining comprises adding a second cell to the neighboring cell list for the first cell based on a ratio exceeding a first addition threshold, wherein the ratio is based on a number of bursts of missing neighbor events associated with the second cell and a total number of soft handover signalling attempts to cells of the wireless telecommunications network;
determining a neighboring cell list for the second cell, wherein determining the neighboring cell list for the second cell comprises adding the first cell to the neighboring cell list for the second cell based on a determination that a number of neighboring cells on the neighboring cell list for the second cell is below a threshold, and based on a determination that backward relations between cells are allowed;

providing the neighboring cell list for the first cell to the at least one second network node; and providing the neighboring cell list for the second cell to the at least one third network node.

* * * * *